United States Patent [19]

MacKenzie et al.

[11] 3,796,959

[45] Mar. 12, 1974

[54] RECEIVER-DISCRIMINATOR CIRCUIT

[75] Inventors: Raymond W. MacKenzie, Pittsburgh; Paul M. Johnston, Greensburg, both of Pa.; John R. Reeves, Orange, Conn.

[73] Assignee: Westinghouse Electric Corporation, Pittsburgh, Pa.

[22] Filed: July 14, 1972

[21] Appl. No.: 271,878

[52] U.S. Cl. .............................. 325/345, 340/167 A

[51] Int. Cl. .............................. H04b 1/16

[58] Field of Search..... 340/167 A, 167 R; 329/106; 179/15 BM; 325/345, 492, 320; 307/234; 328/111, 112, 113

[56] References Cited

UNITED STATES PATENTS

| | | | |
|---|---|---|---|
| 3,119,901 | 1/1964 | Bell et al. | 325/320 |
| 3,582,676 | 6/1971 | Rosenbaum | 307/234 |
| 3,226,570 | 12/1965 | Rosenbaum | 307/234 |

*Primary Examiner*—Robert L. Griffin
*Assistant Examiner*—Jin F. Ng
*Attorney, Agent, or Firm*—M. P. Lynch

[57] ABSTRACT

This invention pertains to circuitry for responding to a transmitter RF signal having impressed thereon an AC pulse signal wherein a radio receiver circuit acts to remove the RF carrier signal and supply the AC pulse signal to a discriminator circuit. The discriminator circuit is designed to respond to a fixed predetermined frequency and if the frequency of the AC pulse signal corresponds to said fixed predetermined frequency, the signal is amplified and applied to a pulse width detecting circuit. The pulse width detecting circuit further analyzes the AC pulse signal to determine if the pulse width of the signal falls within predetermined maximum and minimum limits. The recognition of an AC pulse signal exhibiting the predetermined frequency and pulse width characteristics results in the generation of an output signal.

3 Claims, 10 Drawing Figures

RECEIVER-DISCRIMINATOR CIRCUIT

CROSS REFERENCE TO RELATED APPLICATIONS

This application is related to the following co-filed copending applications all of which are assigned to the assignee of the present invention:

| Ser. No. | Title |
|---|---|
| 271,879 | Self-Powered Wireless Intrusion Alarm |
| 271,877 | Improved Magnetic Pulse Generator |
| 271,880 | Transmitter Circuit |

BACKGROUND OF THE INVENTION

There are numerous requirements for signal processing circuitry capable of accurately identifying characteristics such as frequency, pulse width, amplitude, etc. to interpret information transmitted in signal form from remote locations. Such applications include the fields of security systems, process control, utility billing procedures, etc.

A preferred signal transmission technique utilizes a radio frequency transmitter circuit, thus eliminating the need for hard-wiring between transmitter circuit and receiver circuit.

SUMMARY OF THE INVENTION

The intrusion alarm detection system described herein with reference to the drawings includes one embodiment of a magnetic pulse generator including a spring loaded pole piece-coil assembly for latching with a magnet to set the magnetic pulse generator in a latched condition while the pole piece is maintained in physical contact with the magnet. Upon release of the force maintaining physical contact between the pole piece and the magnet-coil assembly the latched combination is permitted to move in unison within a housing in response to spring biasing by the first spring which movement causes compression of a second spring. This movement is continued until the compression forces developed by the second spring exceeds the holding force of the magnet at which time the magnet is rapidly accelerated away from the pole piece with the resulting collapsing magnetic field producing a pulse.

The pulse produced by this collapsing magnetic field is supplied to a transmitter circuit consisting of a voltage regulator, tone modulator and a modulated oscillator. The transmitting circuit in turn develops and transmits an output pulse having a width which is determined by the magnetic pulse generator. The transmitter circuit is simultaneously frequency modulated by a tone and keyed by a pulse of known width to reduce the probability of alarm response to an erroneous signal. The transmitted pulse is subsequently detected by a remotely located receiver circuit which in turn develops an output signal for initiating an alarm indication in response to a transmitted pulse indicative of intrusion of a secured area.

The receiver circuit consists of a radio receiver having a detector and a discriminator circuit driven from the detector. The discriminator circuitry is driven from the detector of the radio circuit and responds to the signal from that point by selectively amplifying the desired tone frequency, detecting the pulse duration or width of that tone and producing the alarm indication output signal if the detector output signal satisfies predetermined requirements. The discriminator circuit employs a monostable circuit with a built-in latching delay circuit to reject narrow pulse width signals. The discriminator circuit also utilizes an integrator circuit and a switch to reset the monostable circuit in the event the pulse width of the detector signal is too long.

The invention will become more readily apparent from the following exemplary description in connection with the accompanying drawings.

DESCRIPTION OF THE PREFERRED EMBODIMENT

Figure 1:
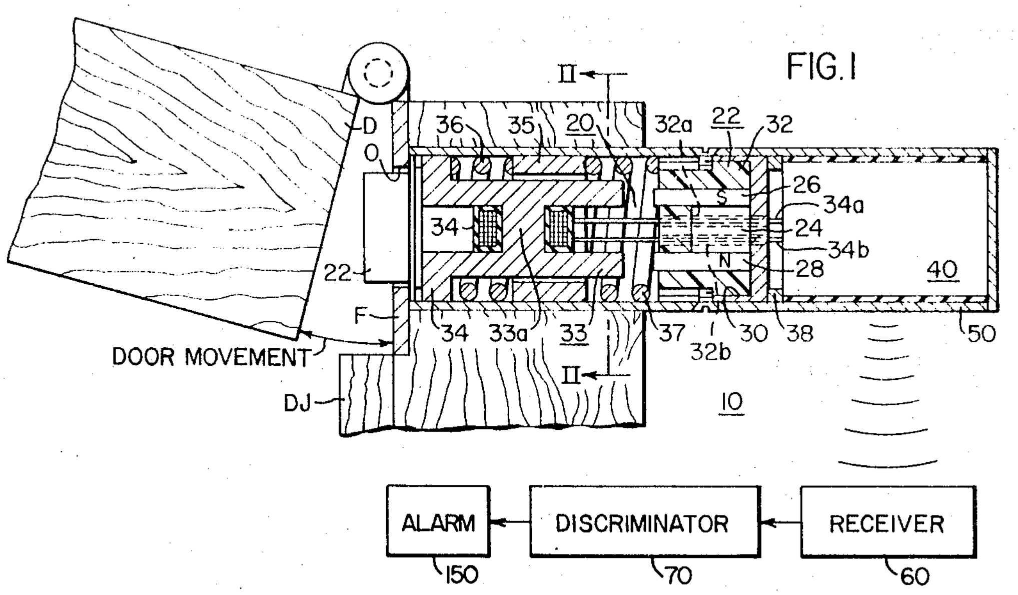
FIG. 1 is a block diagram sectioned schematic illustration of an intrusion alarm protection system.

Referring to FIG. 1 there is illustrated an intrusion detection device 10 comprising a magnetic pulse generator 20 and a transmitter circuit 40 integrally packaged in a cylindrical housing 50. The intrusion detection device 10 is concealed within a doorjamb DJ by a mounting flange F with an actuator rod 22 extending through an aperature O in the flange F for contacting the door D during the opening and closing action of the door D. The closing of the door D causes the magnetic pulse generator 20 to be transferred from an unlatched condition as illustrated in the drawings to a latched condition whereupon subsequent opening of the door will cause the magnetic pulse generator to return to the unlatched condition resulting in the collapse of the magnetic field and the generation of a pulse to which transmitter circuit 40 responds by transmitting an output signal to the receiver circuit 60 of the intrusion detection device 10. The receiver circuit 60 supplies a signal to discriminator circuit 70 which interrogates the received signal and transmits an alarm actuating signal to the alarm circuit 150 when the received signal reflects predetermined characteristics.

STRUCTURE AND OPERATION OF THE MAGNETIC PULSE GENERATOR

Figure 2:
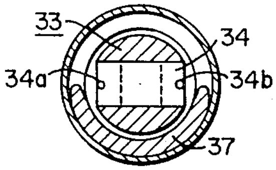
FIG. 2 is a section I—I of the magnetic pulse generator of FIG. 1.

The magnetic pulse generator 10 is comprised of a magnet assembly 22 consisting of a permanent magnet 24 having a north and south pole as indicated, and soft iron extension elements 26 and 28. The combination of the permanent magnet 24 and the soft iron elements 26 and 28 are secured within cylindrical container 30 by potting material 32 in a position to assure protrusion of the elements 26 and 28 beyond the potting compound. The cylindrical assembly 30 is slidably positioned within the intrusion detection device housing 50. An iron circuit represented by the soft iron member 33 having a coil element 34 wound thereabout is slidably positioned within housing 50 in operable alignment with the north and south pole extension elements 26 and 28. The alignment of the soft iron member 33 is provided by the shoulder portion 34 which is slidably positioned relative to the inner wall surface of the housing 50 and the elongated body portion which is slidably inserted through an aperture in a stationary collar 36. In the unlatched condition the soft iron member 33 is maintained in contact with the actuating rod 22 by a spring element 36 acting between the stationary collar 36 and the shoulder 35 of the member 33. The coil element 34 is wrapped around a transition portion 33A of the soft iron member 33 as illustrated in the sectioned view along section line I—I as illustrated in FIG. 2. The wires 34A and 34B extending from the coil 34 pass through passages 32A and 32B respectively provided in the potting material 32 and are terminated in the transmitter circuit 40. In the unlatched condition disclosed in FIG. 1 a second spring element 37 assumes its free length which is slightly less than the space between the stationary collar 35 and the potted magnet assembly 22. The free length of spring element 37 is sufficient however to prevent contact between the magnet extension elements 26 and 28 and the soft iron member 33 as a result of any sliding motion of the potted magnet assembly in response to vibrations.

The movement of the door D to a closed position applies a force to the actuator arm 22 which in turn causes movement of the soft iron member 33 against the spring element 36 which, in the illustrated embodiment, is assumed to apply 15 pounds compression between the shoulder 34 and the stationary collar 35 in the unlatched condition causing further compression of the spring element 36 until a movement of the member 33 results in physical contact between the magnet extension elements 26 and 28 and the soft iron member 33 thus producing a latched condition. In the latched condition the soft iron member 33 acts as a magnetic shunt between the poles of the magnet 24 and provides a magnetic flux path between the elements 26 and 28. This latched condition is maintained while the door D is in a closed position. In the embodiment described, wherein spring element 36 is designed to provide 15 pounds compression in the unlatched condition, a suitable latching force for the magnet 24 is considered to be approximately 13 pounds. In the latched condition the spring element 36 is compressed to a point where it exerts approximately 45 pounds force between the shoulder 34 of the member 33 and the stationary collar 35. During the latched condition the spring element 37 is maintained at its free length. The path of the magnetic flux developed in the latched condition can be traced from the north pole N of the permanent magnet 24 through the soft iron extension element 26 and the soft iron member 33 through the transition portion 33A and ultimately to the south pole S of the magnet 24 through the extension element 28.

When the door D is opened thus removing the force from the actuating rod 22 the 45 pounds of resorting force exerted by the spring element 36 initiates movement of the magnetic pulse generator 20 and the potted magnet assembly 22 in a latched condition toward the flange F. The potted magnet assembly 22 continues to move within the housing 50 until the distance between the potted magnet assembly 22 and the stationary collar 35 has been reduced to the free length of the spring element 37. The force developed by the spring 36 continues to move the latched combination of the soft iron member 33 and the magnetic coil assembly 22 in unison thus resulting in compression of the spring element 37. The compression of the spring element 37 continues until the force developed by the spring element 37 between the stationary collar 35 and the potted magnetic coil assembly 22 exceeds the holding force of 13 pounds supplied by the magnet 24. At the moment the force exerted by the spring 37 exceeds the holding force of the magnet, the potted magnet assembly 22 is separated from the soft iron member 33 and accelerated away from the pole piece by the spring element 37. The rapid acceleration of the magnetic coil assembly 22 from the pole piece 31 to a rest position against stop 38 breaks the magnetic circuit and the flux linking the coil 34 decays rapidly from a saturation level to a zero level thus producing an output voltage pulse which is transmitted to transmitter circuit 40 by the coil leads 34A and 34B. The separation operation thus described renders the pulse magnitude independent of the rate at which the door is opened in that the rate of acceleration of the potted magnet assembly 22 from the soft iron member 33 is determined by the action of the spring 37 and not the rate at which the actuator arm 22 is controlled by the movement of the door D. This feature can be more clearly understood if it is considered in the prior art the potted magnet assembly 22 is stationary and not permitted to slide within the housing 50 in which case the separation of the pole piece from the magnet would be determined solely by the force developed by the spring 36. In this situation it is apparent that if the door was opened at a very slow rate thus allowing the spring 36 to move the pole piece ever so slowly from the latched condition with the magnet assembly, the slow separation of the pole piece from the magnet would produce only a very slight electrical pulse the magnitude of which could very well go undetected. It is apparent that the requirements for slidable movement between various surfaces of the components described above would dictate to some extent the materials chosen. A coating of a material such as nylon or Teflon would be suitable. It is likewise apparent that the rate of separation of the potted magnet coil assembly from the pole piece and the magnitude of the pulse thereby generated are parameters which can be controlled by the design of the springs and the magnets.

The width of the electrical pulse is determined by a number of factors including the number of turns of the coil 34. The more turns the greater the inductance and the larger the pulse width. This parameter in addition to spring and magnetic design are controlled to produce a predetermined pulse width in order to assure accurate signal discrimination by the discriminator circuit 70.

Figure 3A:
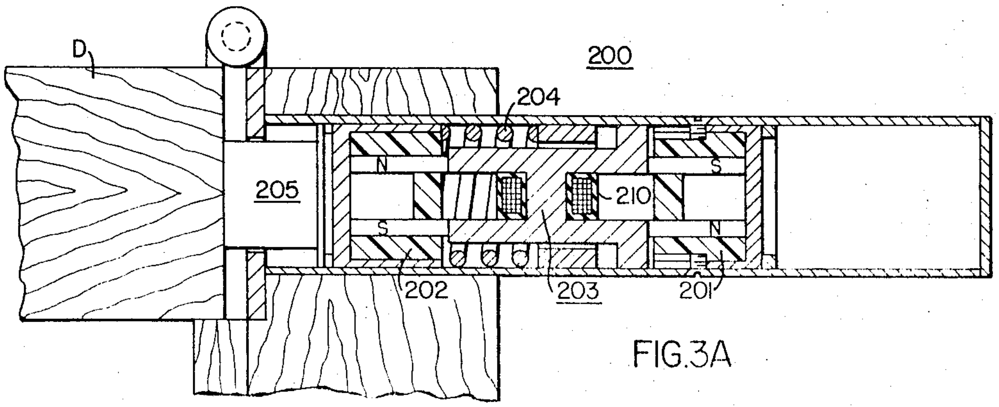
FIGS. 3A, 3B and 3C represent an alternate embodiment of the magnetic pulse generator of FIG. 1.
Figure 3B:
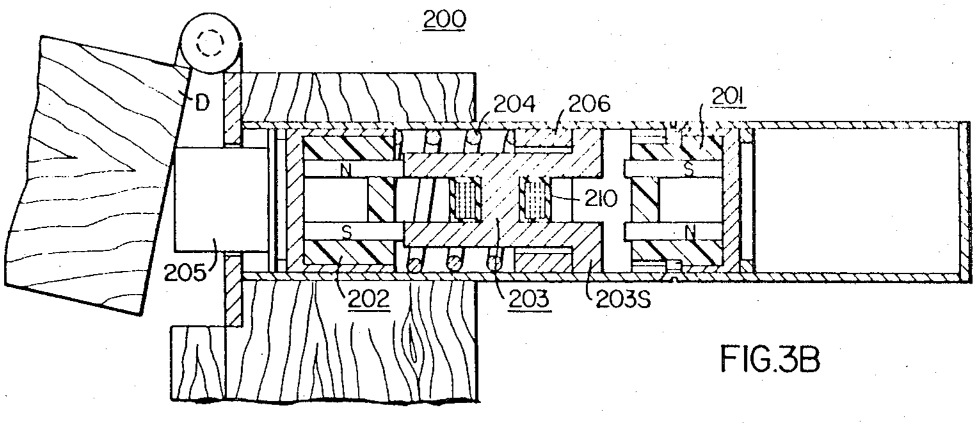
Figure 3C:
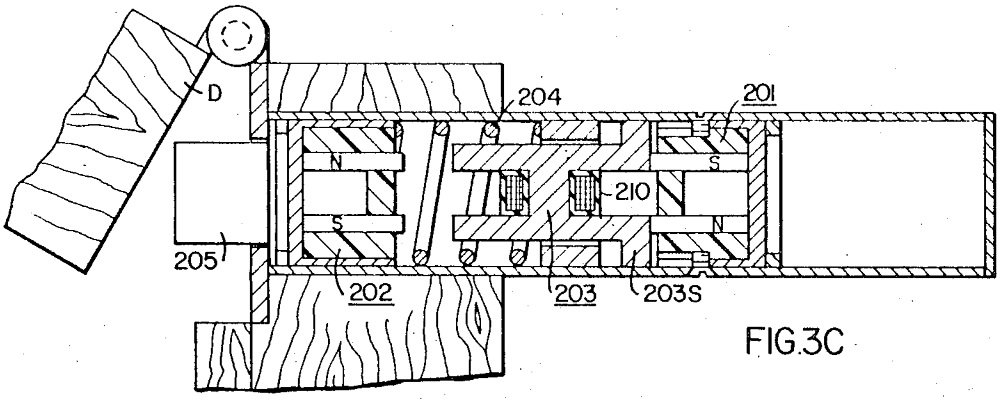

An alternate embodiment of the magnetic pulse generator is illustrated in FIGS. 3A, 3B and 3C. In this embodiment a single spring element and two magnet assemblies are utilized. The voltage generated by this design is essentially double in the voltage of the design of FIG. 1.

Referring to FIG. 3A there is illustrated a magnetic pulse generator 200 comprised of a pair of magnet assemblies 201 and 202 and a single soft iron member 203 wherein the magnetic pulse generator is in a latched condition. The actuator rod 205 responds to the closed position of the door D by forcing magnet assembly 202 against spring element 204 establishing a latched condition between the magnetic assembly 202 and the soft iron member 203 and further causes the soft iron member 203 to make contact and latch with the stationary magnet assembly 201. The force exerted by the spring element 204 in the latched condition will be assumed to be approximately 45 pounds. When the door D is moved from its closed position to an open position thus releasing the latching force established by the actuator rod 205 as shown in FIG. 3B, the spring element 204 operates against a fixed collar 206 to move the latched combination of the magnet assembly 202 and the soft iron member 203 toward the door D in unison. The movement of the latched combination of the magnetic assembly 202 and the soft iron member 203 in response to the spring element 204 breaks contact between the magnet assembly 201 and the soft iron member 203 and continues movement of the latched combination towards the door until contact is made between the shoulder 203S of the soft iron member 203 with the stationary collar 206. With the movement of the soft iron member 203 terminated by the contact between the shoulder 203S and the stationary collar 206, the spring element 204 functions to exert sufficient force to break contact between the magnet assembly 202 and the soft iron member 203 and rapidly accelerates the magnet assembly 202 away from the soft iron member 203 causing a rapid collapse of the magnetic flux linking the coil 210 of the soft iron member 203. This collapse initiates the power generation sequence of the magnetic pulse generator 200.

As the flux collapses a corresponding voltage is produced at the terminals of the coil leads 210*a* and 210*b* which are connected to the transmitter circuit 212. The voltage produced is represented by the following relationship:

$$V = N\,(d\phi/dt)$$

where $N$ is a number of turns of the coil 210 and $(d\phi/dt)$ is the rate of change of magnetic flux.

The change in the flux linkage caused by the rapid separation of the magnet assembly 202 from the soft iron member 203 is aided by the action of magnet 201. The attraction of magnet assembly 201 on the soft iron member 203 following separation of the magnetic assembly 202 from the soft iron member 203 causes a reverse motion of the soft iron member 203 towards the magnet assembly 201. The orientation of the magnet of the magnet assembly 201 is such that the direction of flux linkage is opposite to that established between the magnet assembly 202 and the soft iron member 203. The acceleration of the soft iron member 203 towards the magnet assembly 201 results in an increase of the flux level in the coil 210 to its saturation level in a direction opposite to the change in flux manifested by the acceleration of the magnet assembly 202 away from the soft iron member 203. This opposite polarity change in flux has the effect of increasing the $(d\phi/dt)$ term in the above voltage equation by a factor of 2 thus essentially doubling the energy output from the magnetic pulse generator 200 in response to the opening of the door D. The final position of the components of the magnetic generator assembly 200 in the quiescent, unlatched condition is illustrated in FIG. 3C. The soft iron member 203 is latched or mated with the magnet assembly 201 and the spring element 204 is extended to its free length.

TRANSMITTER CIRCUIT OPERATION

Figure 4:
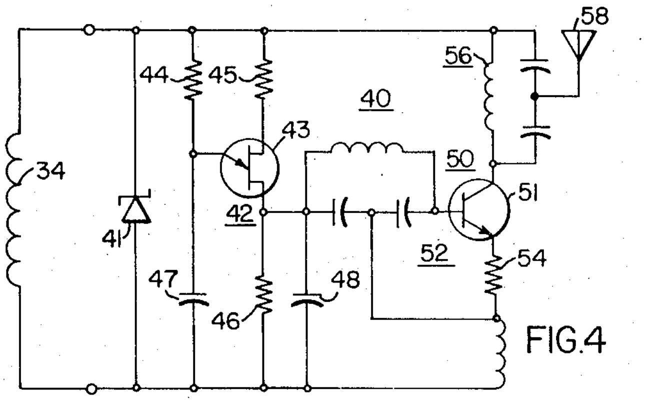
FIG. 4 is an electrical schematic illustration of the transmitter circuit of the embodiment of FIG. 1.

While there are numerous state-of-the-art circuit arrangements available to implement the operation of the transmitter circuit 40 such as that illustrated in the cofiled U.S. Pat. application Ser. No. (W.E. Case 43,126), entitled "Self-Powered Wireless Intrusion Alarm" there is illustrated in FIG. 4 a detailed schematic of a preferred technique for implementing the transmitter circuit 40. The transmitter circuit 40 consisting of a voltage regulator comprised of Zener diode 41, an audio frequency oscillator circuit 42 and an RF oscillator circuit 50 is powered by the pulse modulated output pulse produced by the magnetic pulse generator 20 of FIG. 1. The Zener diode 41 is driven by a series impedance consisting solely of the inductance and the resistance of the coil 34 of the coil 34 of the magnetic pulse generator 20. The magnetic pulse generator 20 is therefore employed as a current generator rather than a voltage generator. The Zener diode 41 functions to conduct the reverse current from the magnetic pulse generator 20 thus protecting the remaining transmitter circuitry from the application of reverse voltage and furthermore eliminating the need of an additional diode for rectification. The absence of a storage capacitor across the coil 34 insures that the pulse width of the signal transmitted by antenna 58 of the transmitter circuit 40 will be the same width as the pulse developed by the magnetic pulse generator 20.

The audio frequency oscillator circuit 42 consists of a unijunction transistor 43 and its associated resistors 44, 45 and 46 and timing capacitor 47. An additional capacitor 48 is used to integrate the narrow output signal developed by the audio frequency oscillator circuit 42 in order to concentrate the modulating energy at a predetermined frequency to which the receiver circuit 60 of FIG. 1 is responsive.

The RF oscillator circuit 50 utilizes a transistor 51 having *a* base *b*, emitter *e* and collector *c* in a Colpitts configuration. The conventional base circuit 52 for the Colpitts configuration, which consists of inductance L, and capacitors C1 and C2, is tuned to one-half of the desired output frequency, i.e. the oscillator is operated as a doubler, to minimize detuning resulting from changes in the output circuit loading. Capacitor 48, which integrates the modulating signal from the audio frequency oscillator circuit 42, also functions as an RF bypass for the base tuned circuit 52. Negative feedback in the RF oscillator circuit 50 which is provided between the output and input by a resistor 54, improves the stability and minimizes amplitude modulation thus providing greater transmitter circuit output power. The primary function of the signal produced by the audio frequency oscillator circuit 42 is to vary the voltage between the base *b* and collector *c* of the transistor 51 in order to frequency modulate the carrier frequency of the RF oscillator circuit 50 at a predetermined frequency over a duration corresponding to the pulse width of the signal produced by the magnetic pulse generator 20. This is accomplished due to the voltage dependance of the collector-base junction capacitance. Direct coupling is employed between the audio frequency oscillator circuit 42 and the RF oscillator circuit 50 such that the DC level at the output of the unijunction transistor 43 tends to decrease with an increase of temperature which in turn tends to compensate for the thermal voltage drift between the base *b* and emitter *e* of the transistor 51. An additional tuned circuit 56 is included in the collector circuit of the transistor 51 and functions to select the desired harmonic, typically the second. The second provides more power than higher order harmonics. The antenna 58 is connected to a capacitive tap on the tuned circuit 56 to provide impedance matching between the transistor output impedance, which is high, and the low impedance of the antenna.

The transmission by antenna 58 of an RF carrier which is frequency modulated at a particular audio tone frequency developed by audio frequency oscillator circuit 42 which exhibits a pulse width characteristic determined by the operation of the magnetic pulse generator, provides a coded signal for analysis by receiver circuit 60 and discriminator circuit 70. This coding minimizes false indications of the operation of the magnetic pulse generator 20 by the alarm circuit 150.

RECEIVER-DISCRIMINATOR CIRCUIT OPERATION

Figure 5:
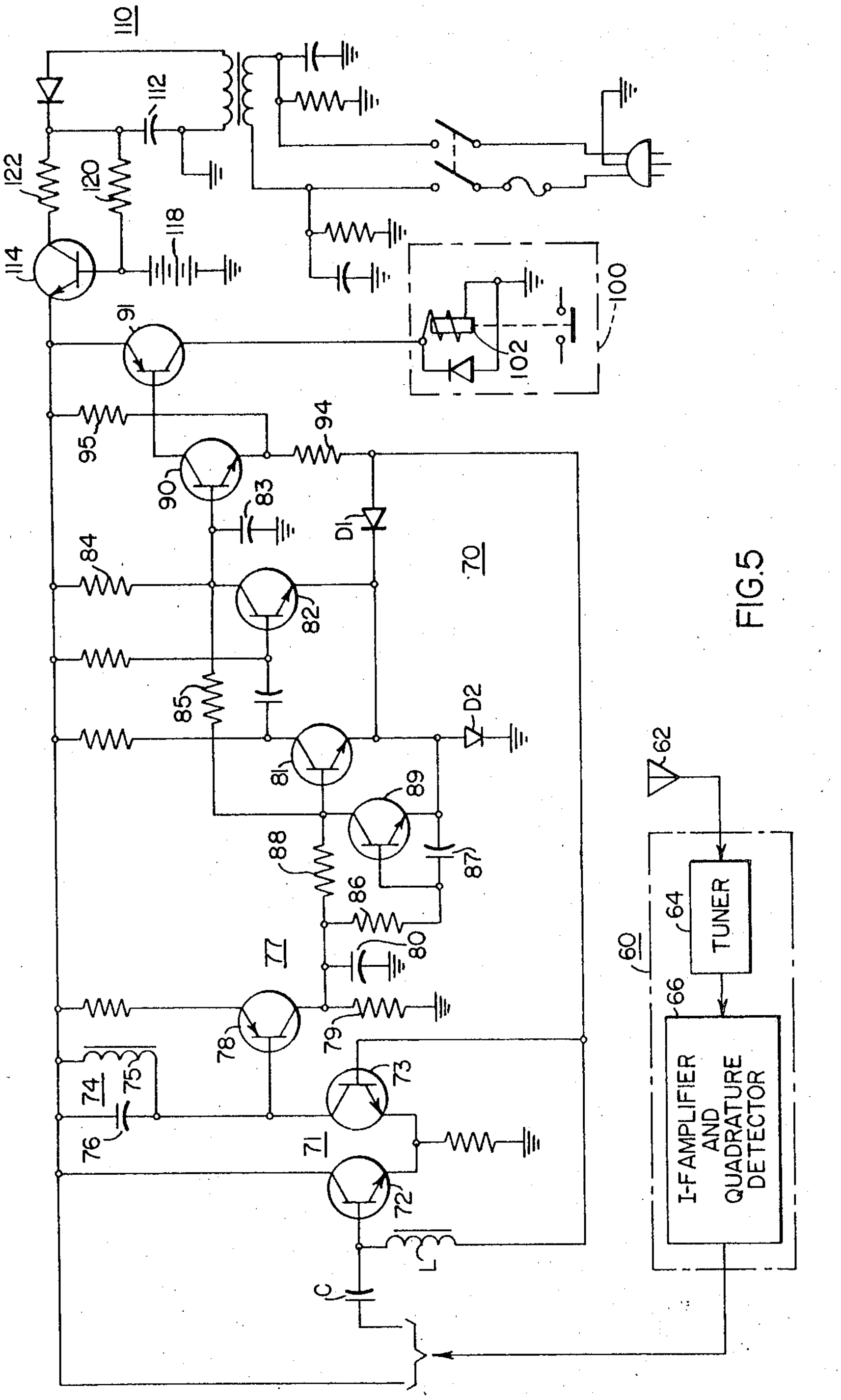
FIG. 5 is a schematic illustration of the discriminator circuit of the embodiment of FIG. 1.

There is illustrated schematically in FIG. 5 a preferred embodiment of a discriminator circuit 70 which is responsive to output signals provided by a commercially available radio receiver circuit 60 which includes an amplifier and a demodulator for receiving the FM modulated sine-wave generated by the transmitter circuit.

The receiver circuit 60 includes antenna 62, FM tuner circuit 64 and IF amplifier and quadrature detector 66. The tuner circuit 64 functions to detect the frequency of received signals corresponding to the predetermined frequency, i.e., 88–108 mHz, established by the transmitter circuit 40 and convert it to a more convenient frequency, i.e., 10.7 mHz, which is subsequently selectively amplified by IF amplifier and quadrature detector 66.

Figure 8:
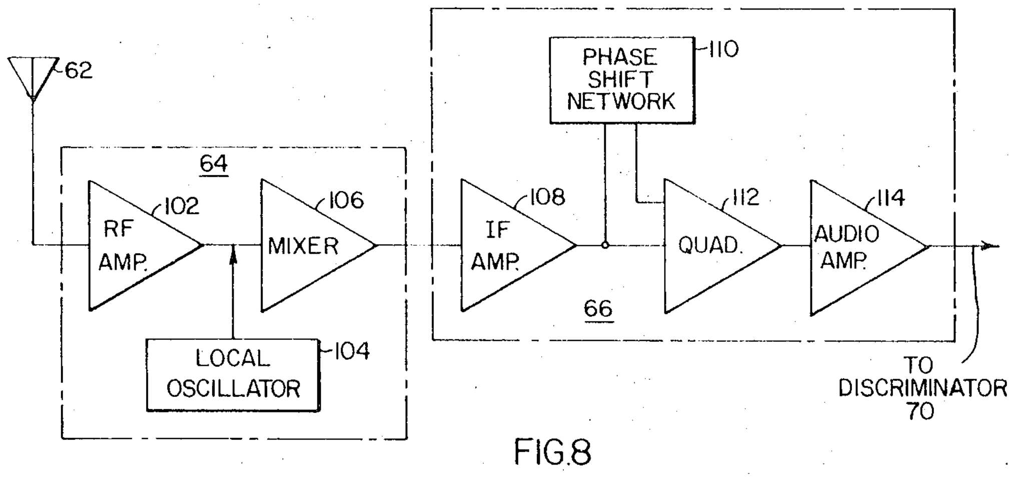
FIG. 8 is a block diagram schematic embodiment of the receiver circuit of FIG. 5.

A more detailed schematic representation of the receiver circuit 60 is illustrated in FIG. 8. The FM tuner circuit 64 includes an RF amplifier 102 which selectively amplifies the transmitted frequency and rejects interfering signals. The output of a local oscillator 104 is mixed with the output of RF amplifier 102 in mixer circuit 106 resulting in an output signal at a lower frequency typically 10.7 mHz. This operation is generally known as superhetrodyning which provides improved sensitivity and selectively while reducing receiver oscillator radiation and adjacent channel interference.

The resulting lower or intermediate, frequency signal is then selectively amplified by the IF amplifier 108 of circuit 66. A portion of the amplified output of IF amplifier 108 is phase shifted by 90° by phase shift network 110 and thus put in quadrature with itself in quadrature detector 112. Audio amplifier 114 provides differential amplification of the output of quadrature detector 112 and supplies an output signal to discriminator circuit 70 exhibiting the predetermined frequency and pulse width information impressed on the carrier frequency in the transmitter circuit 40.

The FM tuner operation of circuit 64 can be satisfied by the Heathkit FM Tuner Model 110–30 while the IF amplifier and quadrature detector can be implemented through the use of Fairchild Semiconductor circuit $\mu$ A754. The discriminator circuit 70 responds to the pulse signal developed by the receiver circuit 60 by selectively amplifying the predetermined tone frequency of the signal, detecting the duration i.e., pulse width, of the pulse signal and transmitting an alarm actuation signal to the alarm circuit 150 if the pulse signal produced by the receiver circuit 60 satisfies the predetermined frequency and pulse width characteristics.

The pulse signal developed by the receiver circuit 60 is coupled to a limiter stage 71 by means of an L-C network comprised of inductor L and capacitor C. The L-C network provides both frequency selectivity to permit selection of single frequency from a spectrum and impedance transformation by matching impedance for efficient power transfer. The limiter circuit 71 is of a symmetrical type including coupled transistors 72 and 73 which drive a parallel resonant circuit 74 consisting of inductor 75 and capacitor 76 to provide additional discriminator circuit selectivity.

The function of the L-C network in combination with the limiter circuit 71 and the parallel resonant circuit 74 is to respond selectively to the predetermined frequency established by the audio frequency oscillator circuit 42 of the transmitter circuit 40 of FIG. 4.

In the absence of a signal from receiver circuit 60 which exhibits the predetermined frequency, no signal will be supplied from limiter circuit 71 for pulse width discrimination by the remainder of discriminator circuit 70.

The frequency discrimination having thus been completed, if the signal processed through the limiter circuit 71 and parallel resonant circuit 74 exhibits the predetermined frequency it is applied to a class C amplifier stage 77 comprised of transistor 78 which functions to provide envelope detection. The operation of the transistor amplifier 77 in the class C mode rather than the class B mode provides the desirable advantage of rendering the amplifier stage insensitive to erroneous low amplitude signals. The high frequency tone signal, i.e. typically 10 to 20 kilohertz, developed by the limiter circuit 71 and the parallel resonant circuit 74 and subsequently supplied to the base electrode of the transistor 78 is illustrated in waveform A of FIG. 6. The transistor 78 in the amplifier configuration illustrated turns on at the negative excursions *a* of the waveform A of FIG. 6 thus developing an output signal which when applied to the parallel combination of resistor 79 and capacitor 80 produces an envelope waveform at the junction of resistor 79 and capacitor 80 of a form illustrated in waveform B of FIG. 6. During the on condition of transistor 78 the capacitor 80 develops a voltage at the junction corresponding to the peak voltage *b* of waveform B and retains essentially this voltage signal during the negative swing of the waveform as illustrated in waveform A due to the high resistance paths provided by resistor 79 and resistor 88. Resistor 79 is typically a 22 kilo-ohm resistor whereas resistor 81 is typically a 1 megaohm resistor. The slight decay in voltage resulting during the negative swing of the waveform A is recovered at the following positive peak of waveform A thus producing the envelope waveform C of waveform B which represents essentially the envelope or outline of the tone signal supplied to the base of transistor 78.

Figure 6:
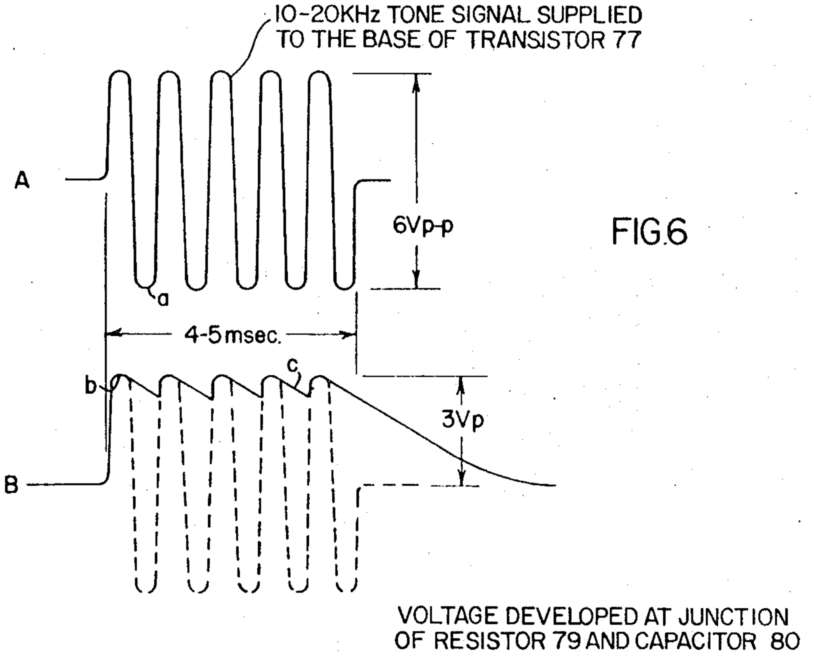
FIGS. 6 and 7 are waveform illustrations of the operation of the discriminator circuit of FIG. 5.

The envelope signal represented in waveform B of FIG. 6 is in the form of a pulse and is subsequently applied to trigger a multivibrator circuit herein represented as a monostable circuit comprised of transistors 81 and 82. In the normal mode of operation of a monostable circuit the input pulse supplied to the base *b* of transistor 81 would produce an output signal in the monostable circuit at the collector *c* of transistor 82 which is subsequently applied to the first stage of the two transistor stage switch comprised of transistors 90 and 91. However, the addition of capacitor 83 which functions as an integrator, at the output of the monostable circuit provides a built-in delay in changing states of the monostable circuit. The minimum pulse duration requirement is established by the capacitor-resistor combination comprised of capacitor 83 and resistor 84. A trigger pulse supplied to transistor 81 having a width less than the predetermined width will fail to develop a voltage signal sufficient to provide feedback through resistor 85 for changing the state of the monostable circuit and for actuating transistors 90 and 91.

The pulse signal supplied as a trigger pulse to the base *b* of transistor 81 is also supplied to a second resistor-capacitor combination comprised of resistor 86 and capacitor 87 which is connected to switching transistor 89. The resistor-capacitor combination of resistor 86 and capacitor 87 serves to establish a maximum signal duration criteria for the input pulse signal for which actuation of the two stage transistor switch circuit 90 and 91 is permitted. The capacitor 87, which functions as an integrator, is connected between the base *b* and emitter e of the switching transistor 89 in order to produce a faster turn on the switching transistor 89 without effecting the delay time established by resistor 86 and capacitor 87. The switching transistor 89 functions as a reset switch for resetting the monostable circuit in response to an input pulse having a duration exceeding the maximum duration criteria established by resistor 86 and capacitor 87. The capacitor 83 establishes a delay which is sufficient to permit reset of the monostable circuit by transistor 89 before developing a voltage sufficient to overcome the threshold level established by resistors 94 and 95 and diodes D1 and D2 to actuate the two stage transistor output switching circuit 90 and activate output circuit 100.

Figure 7:
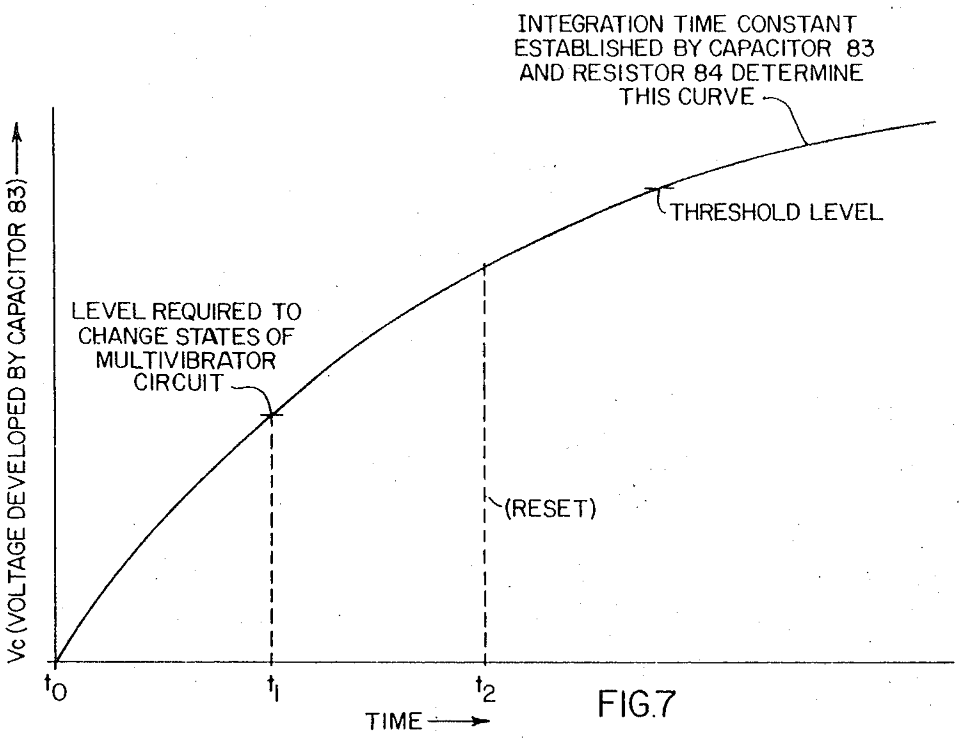

The graphical representation of the voltage developed across capacitor 83, $Vc$, versus time is illustrated in FIG. 7. Pulse signals supplied as trigger pulses to the multivibrator circuit of duration less than $t_1$, fail to change the state of the multivibrator and fail to develop a voltage sufficient to exceed that required to actuate switch circuit 90. Trigger pulses of a width $t_2$ or greater, while causing a change of state of the multivibrator circuit, will produce a reset of the multivibrator circuit at a time prior to the development of level capacitor voltage $Vc$, sufficient to actuate the switch circuit 90.

Thus, the output switch circuit 90 remains off unless the monostable circuit is triggered by an input pulse having a duration or width within the minimum and maximum limits prescribed by the resistor-capacitor networks. Upon the occurrence of an input pulse having a duration within the prescribed minimum and maximum limits the capacitor 83 develops a signal sufficient to overcome the threshold level and actuate switch circuit 90 which remains in an on state thus actuating output circuit 100, herein represented by the relay circuit 102, until a feedbask signal resets the monostable circuit. The monostable circuit could be converted into a bistable multivibrator circuit should it be desirable to maintain the output switch circuit 90 in a conductive state until it is manually reset.

The discriminator circuit 70 further includes an AC-battery power supply which serves to provide power to both the receiver circuit 60 and the discriminator circuit 70. The power supply consists of a transformer operated half-wave rectifier circuit 110 having a capacitor filter 112 which is connected to a voltage regulator circuit consisting of a series regulator transistor 114 and a battery 118 which functions as a reference voltage source for the series regulator transistor 114 during normal AC power conditions. Due to the transistor operation of regulator 114 the battery does not supply load current during normal AC power conditions. In addition, to functioning as a reference voltage source for the series regulator transistor 114 the battery 118 functions to supply load current to the load consisting of receiver circuit 60 and discriminator circuit 70 through the base-emitter junction of the transistor 114 in the event of a main power failure causing loss of AC input power. The battery is maintained at full charge by a trickle current through resistor 120 which is independent of the load current. The use of the battery 118 for the reference voltage source eliminates the traditional use of the Zener diode for the same purpose. The changeover to battery operation in the event of AC power loss is fully automatic and results in no significant change in supply voltage or impedance. The resistor 122 provides three functions: it serves as a parasitic suppressor; it limits the dissipation of transistor 114; and it limits the excess battery drain in the event of failure of filter capacitor 112.

What is claimed is:

1. In an apparatus for producing an output signal in response to AC input signals of predetermined frequency and predetermined duration, the combination of, first means adapted to respond to an AC input signal by detecting and amplifying a predetermined frequency contained within said AC input signal and demodulating said amplified predetermined frequency to produce a DC output pulse having a pulse width corresponding to the duration of said AC input signal, and second means operatively connected to said first means for establishing predetermined maximum and minimum pulse width limits and generating an output signal when the pulse width of said DC output pulse from said first means falls within said pulse width limits, said second means including a multivibrator circuit having an input and an output, the DC output pulses from said first means being applied to the input of said multivibrator circuit to serve as a trigger pulse, an output circuit operatively connected to the output of said multivibrator circuit for producing an output signal in response to an output from said multivibrator circuit, first pulse width analyzer means operatively connected between the output of said multivibrator circuit and said output circuit for establishing a minimum level output from said multivibrator required for activating said output circuit such that a predetermined pulse width corresponding to a value less than said minimum value is insufficient to activate said output circuit, second pulse width analyzer means operatively connected to the input of said multivibrator circuit to respond to output pulses from said first means having a pulse width exceeding said maximum limit by resetting said multivibrator circuit prior to the development of an output from said multivibrator circuit sufficient to activate said output circuit.

2. In an apparatus as claimed in claim 1 wherein said first pulse width analyzing means includes an integrator circuit for integrating over a period of time the output signal from said multivibrator circuit, and said second pulse width analyzing means includes an integrator circuit for integrating the DC pulses supplied to the input of said multivibrator circuit as trigger pulses with respect to time.

3. In an apparatus as claimed in claim 2 wherein said integrating means associated with said first and second pulse width analyzing means are capacitors.

* * * * *